United States Patent
Zielin

[15] 3,661,121
[45] May 9, 1972

[54] DOG FEEDING APPARATUS

[72] Inventor: Ronald P. Zielin, 3760 North Harding, Chicago, Ill. 60618

[22] Filed: Feb. 9, 1970

[21] Appl. No.: 9,577

[52] U.S. Cl. .................................................................119/61
[51] Int. Cl. .........................................................A01k 05/00
[58] Field of Search ............119/61, 68; 248/244, 245, 188.7, 248/221, 226 B

[56] References Cited

UNITED STATES PATENTS

| 1,647,069 | 10/1927 | Ahlman | 119/61 X |
| 3,132,609 | 5/1964 | Chesley | 248/245 X |
| 3,513,986 | 5/1970 | Schier et al. | 248/188.7 X |
| 2,345,650 | 4/1944 | Attwood | 248/244 UX |
| 2,675,782 | 4/1954 | Lage | 119/61 |

Primary Examiner—Hugh R. Chamblee

[57] ABSTRACT

Dog feeding apparatus in which feed dishes are supported on a standard for selective positioning of the feed dishes at appropriate heights for the size and breed of dog.

2 Claims, 6 Drawing Figures

PATENTED MAY 9 1972 3,661,121

INVENTOR
RONALD P. ZIELEN

ATTYS.

PATENTED MAY 9 1972 3,661,121

INVENTOR
RONALD P. ZIELEN

Anderson, Luedeka, Fitch, Even & Tabin
ATTYS.

DOG FEEDING APPARATUS

The present invention relates to feeding apparatus for dogs. More particularly, it relates to feeding apparatus for dogs which is adaptable so as to provide optimum feeding habits for various breeds of dogs, and dogs at various stages of growth.

Professional dog breeders and others having intimate knowledge of correct dog feeding habits, have known for some time it is important that when a dog feeds the food be at an appropriate height. However, this is not nearly as well known among the average dog owner. Usually, the family pet is fed in a container or dish which is placed on the ground or on the floor of the kennel or house, and the dog eats from that level, irrespective of his height and size. In the case of large dogs such as Great Danes, or Saint Bernards, the dog must then eat with its neck extended as low as possible, which is undesirable. To a lesser extent the same is true of smaller dogs, and in general, this mode of feeding is not beneficial to the dog, but, on the contrary, may cause undesirable results.

Although, as previously indicated, professional dog breeders and others have been aware of this, there has not been available a reliable feeding apparatus which provides the desired feeding characteristics for dogs of various sizes and stages of growth. It is, therefore, the primary object of the present invention to provide improved dog feeding apparatus which accomplishes this result. These and other objects of the invention will become apparent from the following description and the drawing, in which.

Figure 1:
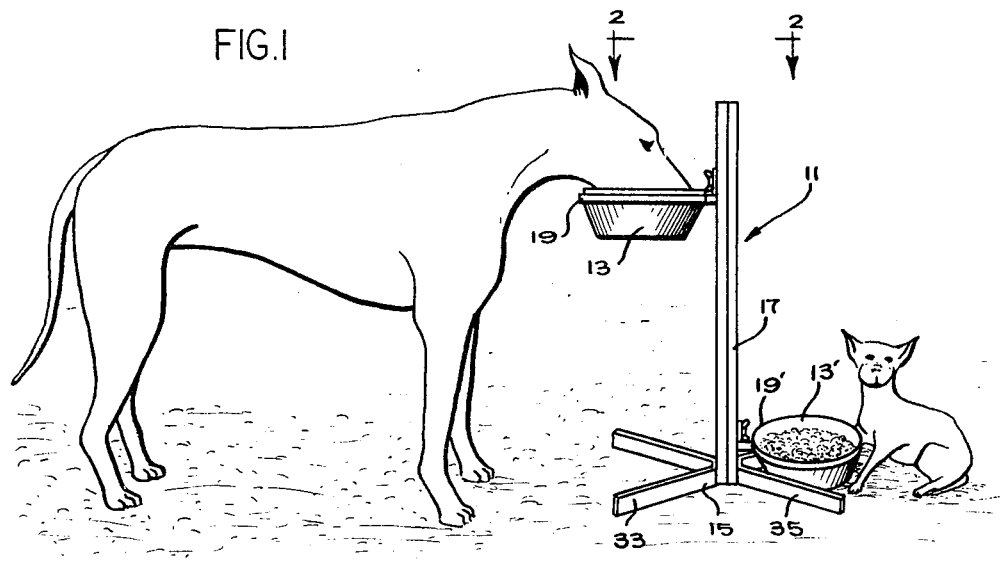
FIG. 1 is a perspective view of one embodiment of apparatus in accordance with the present invention.

In general, and with reference to the drawing, apparatus in accordance with the present invention comprises a dog feeding stand 11 on which feed dishes 13 and 13' are supported. The feeding stand 11 includes a base 15, a standard 17, and dish support rings 19 and 19'. The dish support rings 19 and 19' are adjustably secured to the standard 17 by clamping means 21 and 21'. In accordance with the present invention, as illustrated in the disclosed embodiment, dogs of various sizes and breeds may be provided with food at the proper height, to achieve the most desirable feeding characteristic.

More particularly, the dog feeding dishes 13 and 13', supported in the dish retaining rings 19 and 19', may be individually adjusted at the desired height along the standard 17. Inasmuch as the clamping means 21 and 21' are essentially identical, only clamping means 21 will be particularly described, it being understood that the same description applies to clamping means 21'.

Clamping means 21 includes a bracket 23, a clamping plate 25, a bolt 27 and a wing nut 29. The bracket 23 has two legs substantially at right angles to each other, with the horizontal leg being rigidly secured, as by welding, to the dish support ring 19, and the vertical leg extending vertically upward therefrom. The vertical leg includes a hole through which the bolt 27 is received.

The clamping plate 25 is received on the inside of a channel member 31 which forms half of the standard 17. The clamping plate 25 is disposed adjacent the open side of the channel member 31, and the bracket 23 is disposed on the outside of the partially open side of the channel member 31. It will be seen that by loosening the wing nut 29, the clamping means 21 may be moved up or down along the standard 17 and secured in the proper position for feeding by tightening the wing nut 29.

The base 15 comprises two members 33 and 33', each of which is a strap member bent at about its mid-point to form a right angle. The members 33 and 33' are secured to the channel members 31 and 31' respectively by means of a clamping plate, bolt and wing nut (not illustrated.)

Figure 2:
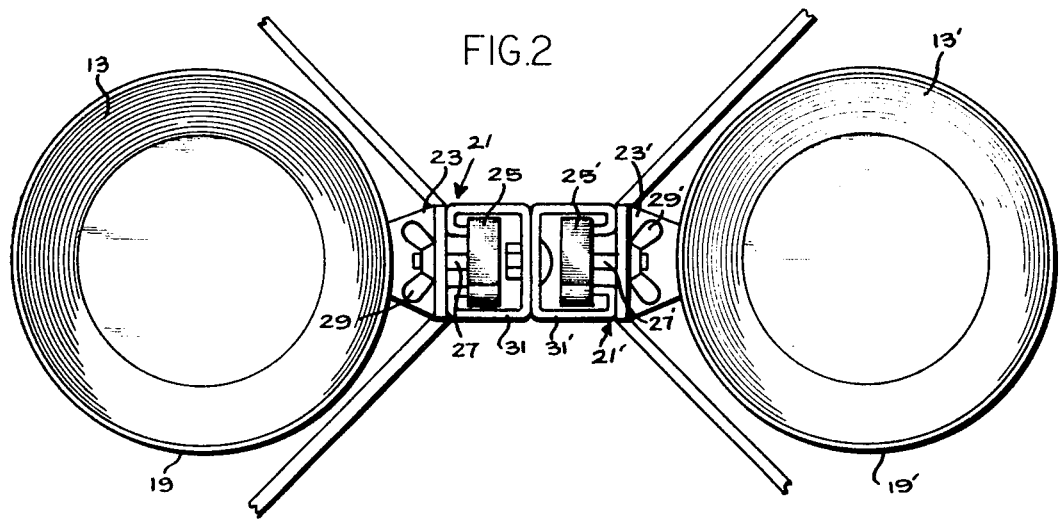
FIG. 2 is a plan view of the feeding apparatus of FIG. 1, as seen along lines 2—2.
Figure 3:
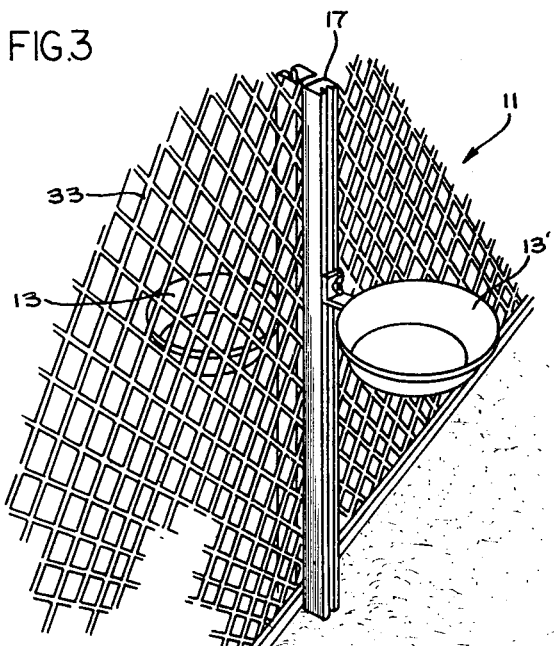
FIG. 3 is a perspective view of another embodiment of apparatus in accordance with the present invention.
Figure 4:
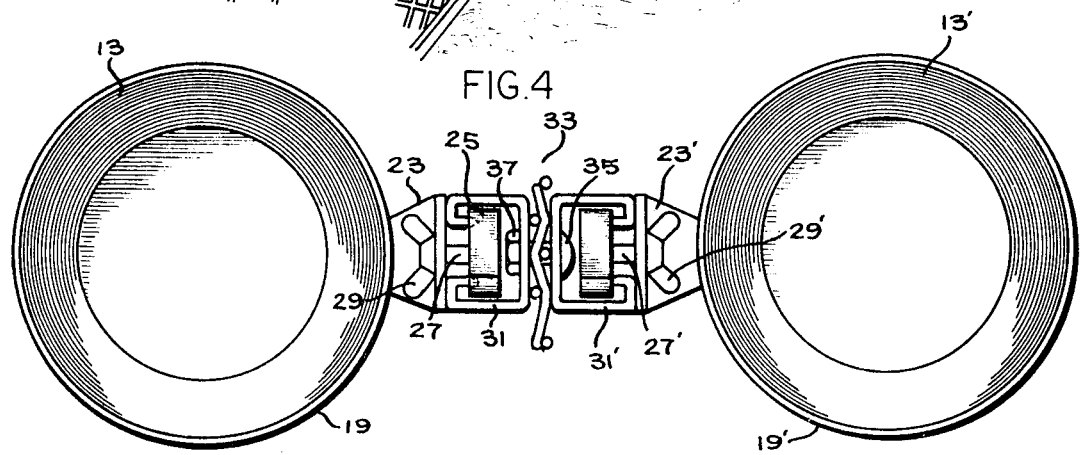
FIG. 4 is a plan view of the feeding apparatus of FIG. 3.

It should be understood that although the base 15 illustrated enables the feeding apparatus to be placed on any horizontal surface, other means of support may also be used. For example, the standard 17 may be fastened to any vertical rigid member instead of to the base 15. Alternatively, the two channel members of the standard 17 may be secured on opposite sides of a chain-link fence, so that feeding may be conducted on both sides of the fence, for example, in two different pens. This embodiment is illustrated in FIGS. 3 and 4 wherein elements corresponding to the elements of the embodiment of FIGS. 1 and 2 are denoted by the same reference numerals. It will be seen that the channels 31 and 31' are fastened to the chain-link fence 33 by a bolt 35 and nut 37 extending through each channel and through the fence.

Figure 5:
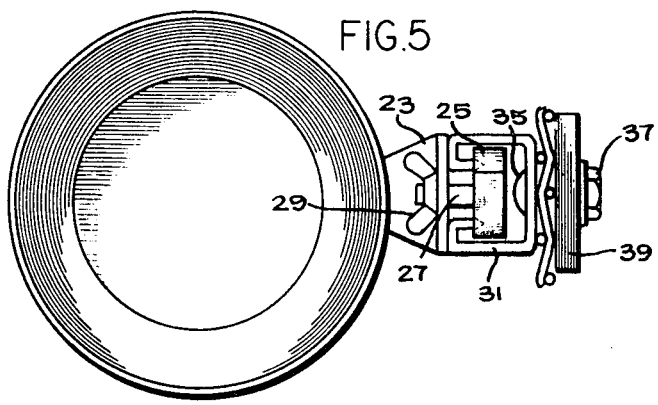
FIG. 5 is a plan view of a modification of the embodiment of FIG. 3.

In the modified embodiment of FIG. 5, only one channel 31 is attached to the chain-link fence by means of a bolt 35, a nut 37 and a plate 39.

Figure 6:
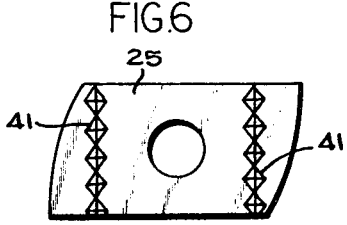
FIG. 6 is an enlarged view of the clamping plate of the apparatus.

FIG. 6 illustrates in greater detail the structure of the clamping plate 25. It will be seen that serrations 41 are provided on the areas of the clamping plate 25 which bear against the edges of the channels 31 and 31'. These serrations tend to prevent relative motion between the plate 25 and the channels.

It should be understood that various modifications of the described apparatus will become apparent from the foregoing description and claims. All such modifications coming within the scope of the claims should be deemed part of the present invention, in that they provide a readily adjustable feeding apparatus which provides optimum desired feeding of any type of dog. Equally importantly, the described apparatus may be manufactured economically so that it will be available to the amateur dog owner, and will thereby provide greatly improved care and treatment of the family owned pet.

Various features of the present invention are set forth in the following claims.

What is claimed is:

1. A portable device for holding feeding dishes comprising in combination, vertical standard means in the form of channel members positioned back-to-back and secured together, a base means secured with a lower end of said standard means, feed dish support means, and clamping means securing said feed dish support means to said standard means, said clamping means being readily adjustable vertically along a vertical slot of each channel member to a preselected height, said clamping means including a clamping plate received in a channel member, said feed dish supporting means including a bracket on the exterior of the channel member having a ring means secured therewith to removably receive a feeding dish and a bolt means extending through a bolt hole in each the clamping plate and the bracket whereby the same are biased against the channel member to retain the clamping means and feed dish supporting means in a desired position.

2. The apparatus in accordance with claim 1 wherein said bracket is extended normally upward from said feed dish support means and said bolt hole is provided in said normal extension a predetermined distance above said feed dish support means.

* * * * *